United States Patent
Boer et al.

(10) Patent No.: US 8,085,806 B2
(45) Date of Patent: Dec. 27, 2011

(54) METHOD AND APPARATUS FOR DETECTING A COLLISION IN A CARRIER SENSE MULTIPLE ACCESS WIRELESS SYSTEM

(75) Inventors: Jan Boer, Odijk (NL); Wilhelmus Diepstraten, Haghorst (NL); Robert John Kopmeiners, Hengelo (NL); Kai Roland Kriedte, Woerden (NL)

(73) Assignee: Agere Systems Inc., Allentown, PA (US)

( * ) Notice: Subject to any disclaimer, the term of this patent is extended or adjusted under 35 U.S.C. 154(b) by 1729 days.

(21) Appl. No.: 10/672,657

(22) Filed: Sep. 26, 2003

(65) Prior Publication Data

US 2005/0068979 A1 Mar. 31, 2005

(51) Int. Cl.
*H04L 12/413* (2006.01)
(52) U.S. Cl. ....................................... 370/445
(58) Field of Classification Search .................. 370/242, 370/344, 347, 431, 445, 447, 248, 252–253
See application file for complete search history.

(56) References Cited

U.S. PATENT DOCUMENTS

| | | | | |
|---|---|---|---|---|
| 4,751,701 A | * | 6/1988 | Roos et al. | 370/445 |
| 5,689,510 A | | 11/1997 | Jacquet et al. | 370/445 |
| 5,721,733 A | * | 2/1998 | Wang et al. | 370/448 |
| 5,892,759 A | | 4/1999 | Taketsugu | |
| 6,088,344 A | * | 7/2000 | Wales et al. | 370/329 |
| 6,157,616 A | | 12/2000 | Whitehead | 370/252 |
| 6,169,759 B1 | * | 1/2001 | Kanterakis et al. | 370/342 |
| 6,469,997 B1 | | 10/2002 | Dorenbosch et al. | 370/337 |
| 6,643,296 B1 | * | 11/2003 | Fukuhara | 370/445 |
| 7,061,877 B1 | * | 6/2006 | Gummalla et al. | 370/278 |
| 2001/0033579 A1 | | 10/2001 | Nelson, Jr. et al. | 370/447 |
| 2003/0026283 A1 | * | 2/2003 | Currivan et al. | 370/441 |

FOREIGN PATENT DOCUMENTS

| | | |
|---|---|---|
| EP | 1 178 630 A1 | 6/2000 |
| EP | 1 178 630 A1 | 6/2002 |
| JP | 61-176225 | 8/1986 |
| JP | 07-312597 | 11/1995 |
| JP | 09-064884 | 3/1997 |
| JP | 10-322362 | 12/1998 |
| JP | 11-289338 | 10/1999 |
| JP | 2001-251667 | 9/2001 |
| WO | WO 98/52299 | 11/1998 |

* cited by examiner

*Primary Examiner* — Pao Sinkantarakorn
(74) *Attorney, Agent, or Firm* — Ryan, Mason & Lewis, LLP

(57) ABSTRACT

A method and apparatus are disclosed for detecting a collision in a carrier sense multiple access wireless communication system. Each transmitting station includes a collision detector that evaluates one or more predefined criteria to determine when a collision has occurred. The collision detector evaluates the measured energy level and optionally payload and/or preamble detection information to determine if a collision has occurred. A collision occurred when an expected ACK message is not received, in the presence of an increased energy level and possibly preamble or payload detection information. The collision detector of the present invention can be activated, for example, at a time corresponding to the start of the 802.11 Short Inter Frame Space interval.

16 Claims, 4 Drawing Sheets

METHOD AND APPARATUS FOR DETECTING A COLLISION IN A CARRIER SENSE MULTIPLE ACCESS WIRELESS SYSTEM

FIELD OF THE INVENTION

The present invention relates generally to collision detection mechanisms in wireless communication systems, and more particularly, to techniques for detecting a collision as a cause of not receiving an acknowledgement message in such wireless communication systems.

BACKGROUND OF THE INVENTION

In a wireless digital communication system, a station obtains access to the medium for transmission (e.g., a radio frequency) by deploying an access algorithm. A system according to the IEEE 802.11 Wireless LAN standards, for example, uses the Carrier Sense Multiple Access (CSMA) algorithm. The CSMA algorithm initially listens to the medium and begins transmitting when the signal level is below a certain threshold. Even with the CSMA algorithm, however, collisions will occur. For example, a collision will occur when two or more stations start transmitting at the same moment. The 802.11 standard provides a mechanism to reduce this probability by using a random back-off counter and using priority windows for transmitting certain packets. In addition, collisions may occur due to a "hidden node" situation, where a transmitting station is not detected by a second station and the second station starts to transmit as well. A third station may receive both transmitted signals. One or both of the transmitted signals may not be detected or recognized by the third station.

The 802.11 standard contains an acknowledgement mechanism to ensure that messages are properly received. After receiving a message in good order, the receiving station sends out an acknowledgement (ACK) message to the transmitting station. This ACK mechanism protects the system against packet loss, e.g., due to collisions. If a collision occurs as described above, one or two stations will not receive an ACK message on their transmitted message. Nonetheless, an ACK message may not be received on a transmitted message, for example, due to (i) an inherent detection failure (a false alarm probability versus a detection probability); (ii) bad signal quality (too much time dispersion); (iii) low signal power (too large a distance); or (iv) interference at the receiving station.

A given 802.11 implementation has several mechanisms available to overcome the inability to successfully transmit a message. If the transmitting station did not receive an ACK message, the transmitting station may retransmit the original message up to N times. The transmitting station increases the random access time with each retransmission. If the N retries fail, the transmitting station may try retransmissions with a more robust modulation. For example, if the N retries fail, the transmitting station may successively retransmit the original message on a lower rate (thereby providing more robust modulation), according to a fall-back algorithm. This proceeds until the maximum number of retries is reached or until the ACK message is received. It is noted that the receiving station may have correctly received the message several times and have responded with an ACK message several times. The receiving station may determine that its ACK message is not getting across (since messages are tagged), but the receiving station will not change its reaction and will continue sending an ACK message after reception of each correct message.

The transmitting station will react the same way in all these cases, including collisions, because the transmitting station does not know why the ACK message was not received. Although the system may have a robust implementation, the lack of knowledge at the transmitting station may result in inefficient reactions. For instance, when a collision is the cause of a lost ACK message, the reaction should not be the use of a more robust modulation, since a more robust modulation may increase the message length as well. In a system with high traffic load (and thus having high collision probabilities), a more robust modulation might be a destructive reaction, causing even more traffic load.

A need therefore exists for a method and apparatus for detecting a collision as a cause of not receiving an ACK message.

SUMMARY OF THE INVENTION

Generally, a method and apparatus are disclosed for detecting a collision in a carrier sense multiple access wireless communication system. Each transmitting station includes a collision detector that monitors the wireless medium to determine when a collision has occurred. The collision detector includes an energy level detector and optionally a payload detector or a preamble detector (or both). The collision detector evaluates the measured energy level and any payload and preamble detection information to determine if a collision has occurred. Generally, if an ACK message is not received when expected, but instead an increased energy level (higher than the normal background noise) is detected, optionally combined with preamble or payload detection information (not from the ACK message), the transmitting station may assume that a collision occurred.

Once transmitted data has been successfully received by the recipient station, the recipient station transmits an ACK message back to the transmitting station. The collision detector of the present invention can be activated, for example, at a time corresponding to the start of the 802.11 Short Inter Frame Space interval (i.e., just after a transmission). The collision detector may remain on (i) until the end of the expected ACK message (which coincides with the start of the DIFS interval); (ii) until the expected start of new data (which coincides with the end of the DIFS interval); or (iii) just long enough to perform the collision detection measurements. A disclosed collision detection algorithm evaluates the energy level measurements and optionally the preamble or payload detection values (or both) in accordance with predefined criteria to determine if a collision has occurred.

A more complete understanding of the present invention, as well as further features and advantages of the present invention, will be obtained by reference to the following detailed description and drawings.

DETAILED DESCRIPTION

Figure 1:
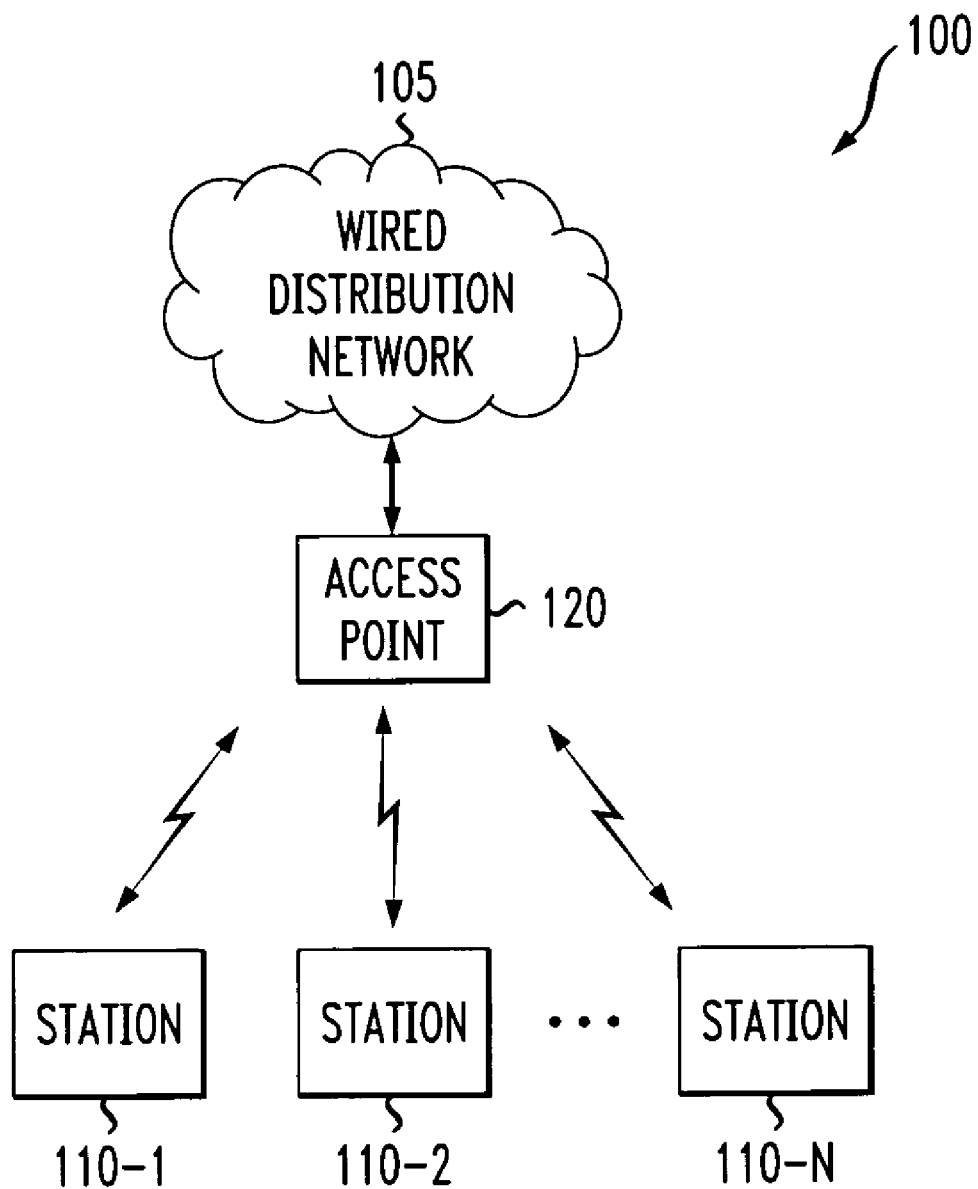
FIG. 1 illustrates a wireless network environment in which the present invention can operate.

According to one aspect of the invention, collisions are detected as a cause of not receiving an ACK message. With this information, a transmitting station can determine why the ACK message was not received and can react appropriately. FIG. 1 illustrates a wireless network environment 100 in which the present invention can operate. The wireless network environment 100 may be, for example, a wireless LAN or a portion thereof. As shown in FIG. 1, a number of stations 110-1 through 110-N, collectively referred to as stations 110, communicate over one or more wireless channels in the wireless digital communication system 100. An access point 120 is typically connected to a wired distribution network 105 with other access points (not shown). The access point 120 typically provides control and security functions, in a known manner. The stations 110 may each be embodied, for example, as personal computer devices, or any device having a wireless communication capability, such as a cellular telephone, personal digital assistance or pager. It is noted that two or more stations 110 may also communicate directly with one another, without the Access Point 120, in a Distributed Control Function (DCF) mode.

The wireless network environment 100 may be implemented, for example, in accordance with the IEEE 802.11 Standard, as described, for example, in "Wireless LAN Medium Access Control (MAC) and Physical Layer (PHY) Specifications (1999); IEEE Std 802.11a; High-speed Physical Layer in the 5 GHz band; 1999; IEEE Std 802.11b; Higher-Speed Physical Layer Extension in the 2.4 GHz Band; 1999; or IEEE Std 802.11g/D1.1; Further Higher-Speed Physical Layer Extension in the 2.4 GHz Band; Draft version; January 200, each incorporated by reference herein.

According to one aspect of the invention, one or more of the stations 110 includes a collision detector 400, as discussed further below in conjunction with FIG. 4, that evaluates one or more predefined criteria to determine when a collision has occurred. In addition, one or more access points 120 may optionally include a collision detector 400. While the exemplary embodiment of the present invention is described as part of a station 110, the present invention can also be implemented in an access point 120, as would be apparent to a person of ordinary skill in the art. As discussed further below, the collision detector 400 includes an energy level detector and optionally a payload detector or a preamble detector (or both). Thus, if an ACK message is not received when expected, but instead an increased energy level (higher than the normal background noise) is detected, optionally combined with preamble or payload detection (not from the ACK message), the transmitting station may assume that a collision occurred.

Figure 2:
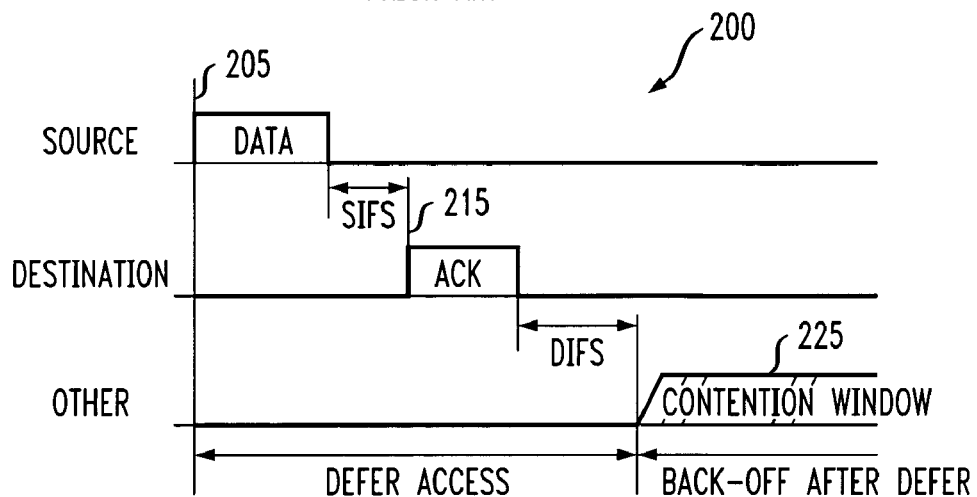
FIG. 2 illustrates a time line for an exemplary access algorithm according to the IEEE 802.11 standard.

As previously indicated, a station 110 obtains access to the medium for transmission (e.g., a radio frequency) by deploying an access algorithm 200, shown in FIG. 2. FIG. 2 illustrates a time line 200 for an exemplary access algorithm within the IEEE 802.11 standard. As shown in FIG. 2, the transmitting station 110-t starts sending data at a time 205. After the data has been received correctly by the recipient station 110-r, the recipient station 110-r transmits an ACK message back to the transmitting station 110-t, beginning at a time 215. A Short Inter Frame Space (SIFS) occurs between receipt of the data by the recipient station 110-r and transmitting the ACK message to the transmitting station 110-t. In addition, a Distribute Inter Frame Space (DIFS) is a period that other stations have to defer until they may start transmitting a new message. The start of the new message is deferred with a random back-off period in order to avoid collisions. Thus, a new message from another station may start a random moment within the contention window 225. Depending on the implementation, that other station 110 may start its transmission already a DIFS period after the end of the transmission of station 110-t. Other implementations wait until the end of an ACK, whether it will be actually transmitted or not. Since the SIFS period is shorter than the DIFS period, it is guaranteed that other stations defer for the ACK message of stations they can observe.

As previously indicated, even with the access algorithm 200, collisions can occur. For example, if two or more stations have the same random back-off period, a collision can occur. In addition, in a hidden node situation, a transmitting station 110-t is not detected by a second station 110-2 and the second station 110-2 starts to transmit as well. A third station 110-3 may receive both transmitted signals. One or both of the transmitted signals may not be detected or recognized by the third station. While the present invention does not avoid such collisions, the invention detects that a collision has occurred.

Figure 3:
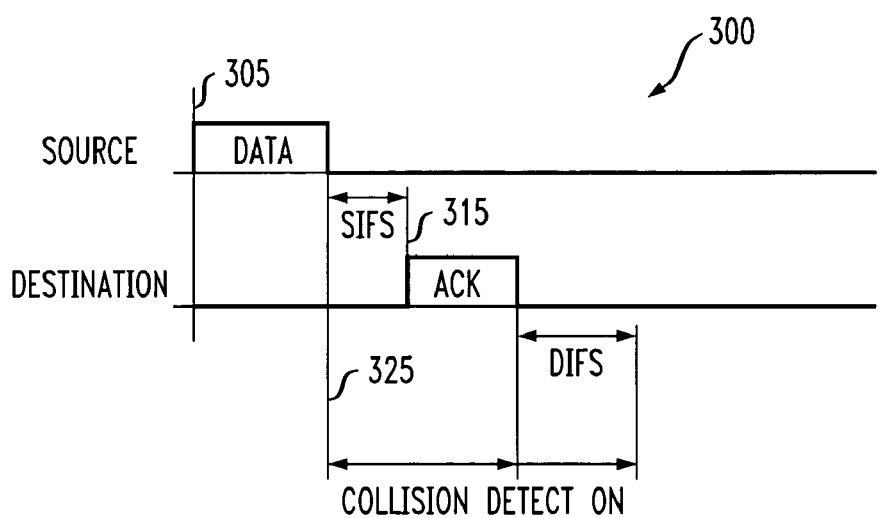
FIG. 3 illustrates a time line for an exemplary access algorithm incorporating the collision detection mechanism of the present invention.

FIG. 3 illustrates a time line 300 for an exemplary access algorithm incorporating the collision detection mechanism of the present invention. As shown in FIG. 3, the transmitting station 110-t starts sending data at a time 305. After the data has been received correctly by the recipient station 110-r, the recipient station 110-r transmits an ACK message back to the transmitting station 110-t, beginning at a time 315. As shown in FIG. 3, the collision detector 400 of the present invention can be activated, for example, at a time 325, corresponding to the start of the SIFS interval. In other words, the transmitting station 110-t activates the collision detector 400 just after a transmission. The collision detector 400 may remain on (i) until the end of the expected ACK message (which coincides with the start of the DIFS interval); (ii) until the expected start of new data (which coincides with the end of the DIFS interval); or (iii) just long enough to perform the collision detection measurements discussed below.

When the collision detection window is activated just long enough to do the detection, this would optimally be the SIFS period. A given 802.11 implementation, however, may not be able to start receiving (e.g., performing the energy level measurements) immediately after a transmission. Thus, the collision window can start just after the SIFS interval and continue until the last detector is ready. When the collision detector 400 considers only the energy level (and not preamble or payload detection) this is until the end of the energy level measurement, hence 1-4 symbols. When the collision detector 400 considers the energy level, as well as preamble or payload detection, the Barker payload detector may be the bottleneck, taking a significant part of the 20 µs slot time (14 µs for WaveLAN). This overlaps with an expected ACK. Hence, first it must be determined if the received signal is an expected ACK (possibly a full reception of a packet is required then), before the collision detector can be validated.

Figure 4:
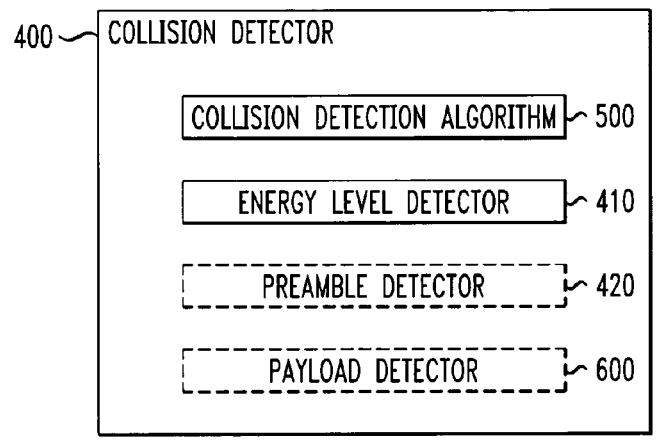
FIG. 4 is a schematic block diagram illustrating an exemplary collision detector incorporating features of the present invention.

FIG. 4 is a schematic block diagram illustrating an exemplary collision detector 400 incorporating features of the present invention. As previously indicated, the collision detector 400 includes an energy level detector 410 and optionally a preamble detector 420 or a payload detector 600 (discussed further below in conjunction with FIGS. 6A and 6B) (or both). In addition, the collision detector 400 includes a collision detection algorithm 500, discussed further below in conjunction with FIG. 5, that evaluates the energy level measurements and optionally the preamble or payload detection values (or both) in accordance with predefined criteria and determines if a collision has occurred. Generally, the energy level detector 410 measures the energy level of the incoming signal. If no signal is received, the energy level detector 410 measures the background noise (silence level). The preamble detector 420 and payload detector 600 detect the preamble and payload portions of a packet, respectively. Thus, if an ACK message is not received when expected, but instead an increased energy level (higher than the normal background noise) is detected, optionally combined with preamble or payload detection (not from the ACK message), the transmitting station 110-t may assume that a collision occurred.

The energy level detector 410 may be embodied using the energy level detectors already included in conventional 802.11 receivers for other purposes. Generally, the energy level detector 410 performs a Received Signal Strength Indication (RSSI) measurement to determine the energy level. The integration constant may be, for example, one to four symbols for the exemplary IEEE 802.11 implementation. Generally, if the integration constant is too short, peak measurements are obtained. If the integration constant is too long, the response is accurate, but long. As discussed below in conjunction with FIG. 5, a collision detect threshold should be established to reflect the inaccuracy of the energy level measurement. The collision detect threshold can be either a fixed predetermined value or an estimated value based on historical values. For historical values, the collision detect threshold is typically the background noise or silence level plus a predefined margin.

The preamble detector 420 may be embodied using the preamble detector already included in conventional 802.11 receivers for other purposes. As previously indicated, the payload detector 600 is discussed below in conjunction with FIGS. 6A and 6B.

Figure 5:
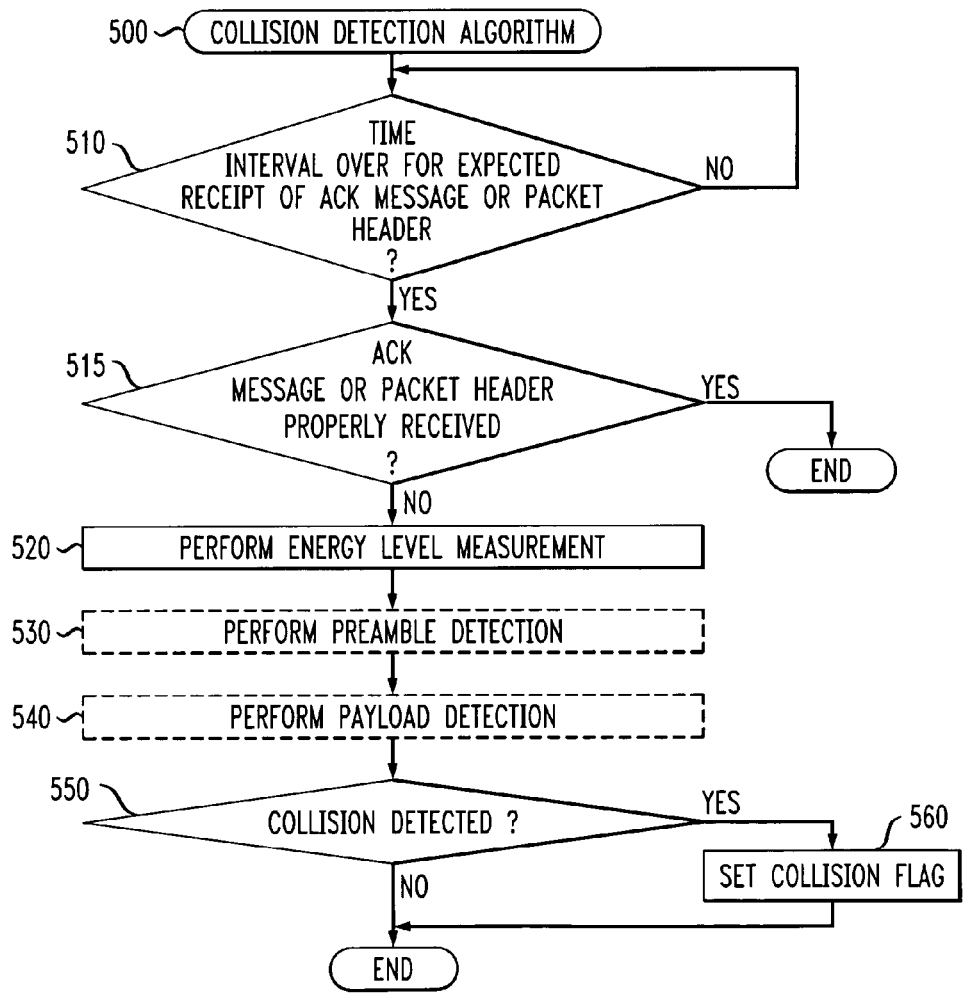
FIG. 5 is a flow chart describing an exemplary implementation of the collision detection algorithm of FIG. 4.

FIG. 5 is a flow chart describing an exemplary implementation of the collision detection algorithm 500. As previously indicated, the collision detection algorithm 500 evaluates the energy level measurements and optionally the preamble or payload detection values (or both) in accordance with predefined criteria and determines if a collision has occurred. As shown in FIG. 5, the collision detection algorithm 500 initially performs a test during step 510 to determine if the time interval is over for the expected receipt of an ACK message or a packet header. If it is determined during step 510 that the time interval is not over, then program control waits until such time interval is over. If, however, it is determined during step 510 that the time interval is over, then a further test is performed during step 515 to determine if an ACK message or packet header was properly received. In this manner, any reaction on the collision detection is postponed until the ACK or data header should have been received. If the ACK or data header is received correctly during step 515, then further reaction on the collision detection is abandoned and program control terminates. In a further variation, the transmitting station 110-t only waits for an ACK message and reacts on preambles in the mode it can expect. For instance, a message with OFDM modulation results in an ACK message with an OFDM preamble and OFDM modulation. A CCK message will result in an ACK with a Barker preamble. Thus, the preamble detector 420 of the other-than-expected modulations are then parts of the collision detect condition.

If, however, the ACK message or packet header is not correctly received then program control proceeds to step 520, and optionally steps 530 and 540, where energy level, preamble detection and payload detection measurements are evaluated, respectively. The ACK takes many μs, as well as any preamble. The actual measurements for steps 520-540 should already be performed at the beginning of the ACK or packet. They are evaluated or validated as indicated in FIG. 5. A further test is performed during step 550 to determine if a collision has been detected. For example, the collision detection algorithm 500 may employ one or more of the following rules during step 550 to determine if a collision has been detected:

CollisionDetect:=
   (EnergyLevel>CollisionDetectThreshold);
CollisionDetect:=
   (EnergyLevel>CollisionDetectThreshold) AND (PayloadDetect);
CollisionDetect:=
   (EnergyLevel>CollisionDetectThreshold) AND (PayloadDetect OR PreambleDetect), where CollisionDetect Flag is a flag that is set during step 560, when appropriate for a detected collision; EnergyLevel is a numerical value determined by the energy level detector 410 representing the energy level; CollisionDetectThreshold is a numerical threshold above which the energy level indicates that another source is transmitting; PayloadDetect is a flag set by the payload detector 600 indicating that a Barker, CCK or OFDM payload has been detected; and PreambleDetect is a flag set by the preamble detector 420 indicating that a preamble of a Barker, CCK or OFDM signal has been detected.

If it is determined during step 550 that a collision has been detected, then the CollisionDetect flag is set during step 560, before program control terminates. If, however, it is determined during step 550 that a collision has not been detected, then program control terminates without setting the CollisionDetect flag.

It is noted that the second and third alternative definitions employed during step 550 uses the payload detector information. The payload detector information is useful, for example, in an environment where varying background noise or interference from other devices (not wireless LANs using the same standard) is expected. For those cases, a high-energy level does not necessarily indicate a collision but merely too much interference and a different reaction may be appropriate. The third alternative definitions employed during step 550 also uses the preamble detector information. Normally, the station 110 always starts receiving and processing the incoming signal when a preamble is detected. However, there are a few situations where processing the preamble or the following data is stopped. In these cases, the usage of the PreambleDetect condition in the third collision detection definition is useful. For example, processing may be stopped where the message is intended for another station; the message has invalid SIGNAL fields; or the energy level is below a certain detection threshold. It is further noted that the various alternative CollisionDetect definitions can be used in different stages of the access mechanism. For example, the PayloadDetect and PreambleDetect are useful during the SIFS or DIFS intervals where no signal should be present. The PayloadDetect (depending on the modulation) provides useful information if it is enabled during the preamble phase.

Figure 6A:
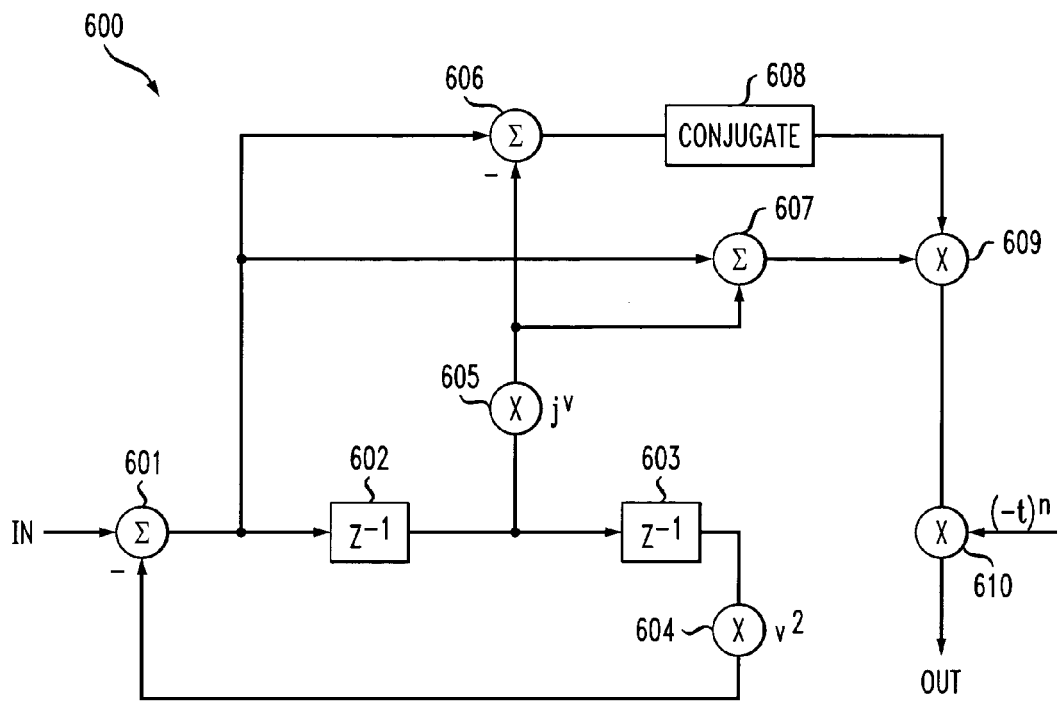
FIGS. 6A and 6B are schematic block diagrams of exemplary implementations for the payload detector of FIG. 4 for CCK and OFDM codes, respectively.
Figure 6B:
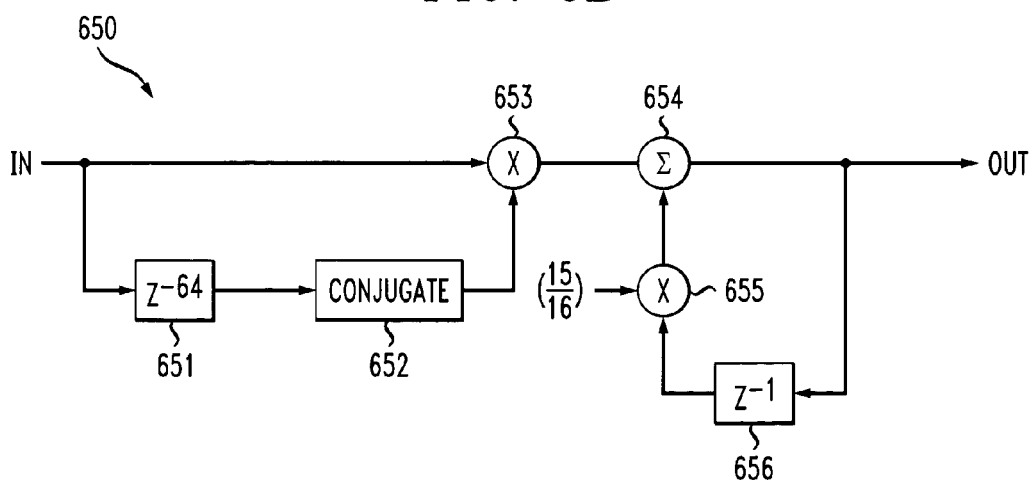

FIGS. 6A and 6B are schematic block diagrams of exemplary implementations for the payload detector 600 of FIG. 4 for CCK and OFDM codes, respectively. It is noted that for Barker codes, the payload detector 600 may employ the same circuitry as the preamble detector 420, discussed above. For Complementary Code Keying (CCK) and OFDM symbols, the payload detector is not the same as the preamble and dedicated payload detectors may be applied. For CCK, the CCK codes are to be detected. For OFDM, OFDM symbols must be detected. The payload detectors for CCK and OFDM codes may be embodied, for example, in accordance with the teachings of U.S. patent application Ser. No. 09/919,511, filed Jul. 31, 2001 or corresponding European Patent Application EP 1,178,630 A1, each entitled "Wireless LAN With Enhanced Carrier Sensing," and incorporated by reference herein.

FIG. 6A is a schematic diagram of an exemplary payload detector 600 for high bit rate payload transmission, for high bit rate carrier detection in the 2.4 GHz band. It is noted that OFDM high-speed modulation is now part of the 2.4 GHz band as well, defined by the IEEE 802.11 g standard. The Barker and CCK modulation are also part of this new standard. The Barker preamble detector detects Barker codes. Detector 600 of FIG. 6A detects the CCK signal, while detector 650 of FIG. 6B will detect OFDM. The detector 600 is based on a complex-valued processing filter.

The detector 600 comprises an input, an output, summation units 601, 606, 607, signal delay units 602, 603, multiplication units 604, 605, 609, 610, and a conjugation unit 608.

In the detector 600, the input is connected to the first summation unit 601, which connects to the second and the third summation unit 606, and 607, respectively, and to the first delay unit 602. The first delay unit 602 connects to the first multiplication unit 605 and to the second delay unit 603. The second delay unit 603 connects to the second multiplication unit 604, which connects again to the first summation unit 601. The first multiplication unit 605 is connected to the second summation unit 606, which is further connected to the conjugation unit 608. The first multiplication unit 605 is further connected to the third summation unit 607. The third summation unit 607 is connected to the third multiplication unit 609, which also is connected with the conjugation unit 608 and the fourth multiplication unit 610. The fourth multiplication unit 610 is further connected to the output.

A signal, entering the input, is directed through the detector 600 along the path as indicated by the depicted arrows, and is processed by the processing units 601-610 on its path. To summarize its function: in the detector 600, a complex signal, entering the input, (i.e. the I (in-phase) component and the Q (quadrature) component of a received signal) is supplied to two IIR (Infinite Impulse Response) filters with a known bi-quad structure. The signals in the two respective IIR filters are multiplied with each other to produce only the imaginary component (at the third multiplication unit 609) which is used for integration (or summation) after sign inversion of the odd numbered samples (at the fourth multiplication unit 610). Such an integration result can be used for symbol timing tracking because of the phase alterations of the CCK signal which occur every 91 ns (at 11 MHz chip rate).

With the chip rate of 11 MHz as defined by IEEE 802.11b and a chosen sampling rate of 22 MHz, a chip duration entails two sampling intervals. The modulation defined in IEEE 802.11b at 5.5 Mbps and 11 Mbps is based on assigning 16 and 256 CCK patterns out of 48 possible patterns per symbol interval of 8 chips with 4 possible phases between the I and Q component of a received signal.

However, due to the random-like phase jumps once per chip interval, the received signal appears as a QPSK signal at 11 MHz. The ratio of 2:1 between sampling rate and chip rate provide a simple way of digital signal processing with IIR filter coefficients of 0, +1, −1, +i, and −i. When using another ratio different from 2:1, the processing would require a more complex IIR filtering approach with complex-valued multipliers other than 0, +1, −1, +i, and −i, and would include a higher computational load of a DSP.

Furthermore, to distinguish between noise and QPSK signals, the DSP compares the phase of the received signal after every 22 samples. The difference of the absolute phase is integrated over the whole integration period, except for an initial blank time (due to the finite response time of the IIR filters). In case of QPSK signals, a strong phase correlation is found, which is absent for noise. In this embodiment of the present invention a reliable detection of CCK (payload) signals can be achieved by combining the signal level information, the low bit rate carrier detection, both known from the prior art, and the high bit rate carrier detection by payload detector 600 using the phase correlation between sampled QPSK signals.

In wireless LANs according to IEEE 802.11a that use the 5 GHz band with OFDM modulation, and in wireless LANs according to IEEE 802.11g that use the 2.4 GHz band with OFDM modulation, a carrier detector in a wireless LAN device (station 110 or access point 120), is capable of sensing both preamble and payload transmissions in a similar way as for a wireless LAN as defined by IEEE 802.11b. Carrier sensing is also performed on the signal level, preamble transmission, and payload transmission. During signal level sensing, the signal level of a received signal is determined. The detection of a preamble transmission involves a signal synchronization and training procedure, in a known manner.

However, due to the different modulation methods QPSK and OFDM, the payload carrier detection cannot be performed as disclosed for FIG. 6A. In a payload data frame transmitted as a OFDM modulated signal, the payload symbol is encoded by cyclic extension in order to enhance the robustness of transmissions: within a payload symbol interval of 4 μs, a first signal transmitted during the first 800 ns of the interval, is repeated by a second identical signal during the last 800 ns of the interval. Therefore, the payload detector 650 shown in FIG. 6B is based on the cyclic extension of symbols, and the auto-correlation of the first signal with the second identical signal with the symbol interval.

Similar to FIG. 6A for the high rate carrier detection in the 2.4 GHz band, FIG. 6B shows a schematic implementation of a payload detector 650 for high rate payload OFDM transmission (can be both in 2.4 and 5 GHz).

The detector 660 comprises an input, an output, a summation unit 654, signal delay units 651, 656, multiplication units 653, 655, and a conjugation unit 652. In the detector 650, the input is connected to the first multiplication unit 653, which connects to the summation unit 654 and the conjugation unit 652. The input is also connected through a second line with the first signal delay unit 651. The first signal delay unit 651 connects to the conjugation unit 652. The first multiplication unit 653 further connects to the summation unit 654, which connects to the second multiplication unit 655 and the output 657. The second multiplication unit 655 is also connected with the second signal delay unit 656, which also connects to the output 657.

A signal, entering the input of detector 650, is directed through detector 650 along the path as indicated by the depicted arrows, and is processed by the processing units 651-656 on its path. To summarize its function: in detector 650, a complex signal entering the input, (i.e. the I (in-phase) component and the Q (quadrature) component of a received signal) is multiplied with the complex conjugate of its 3.2 μs delayed version (at the first multiplication unit 653, which gets at an interval sampling rate of 20 MHz the conjugate of the 64 samples delayed version of the received signal in question), the real-valued signal from this multiplication is averaged by a leaky integrator (comprising the summation unit 654, the second multiplication unit 655 and the second signal delay unit 656) to determine an average value of the correlation between the input signal and its 3.2 μs delayed version for the last period (of 16 samples, which, at a sampling rate of 20 MHz, cover an 800 ns interval).

The leaky integrator provides a time-based output signal in which auto-correlation peaks with a period of 4 μs are present. By means of these periodic peaks the payload detector 650 determines whether a payload transmission is in progress or not. (In case a signal without cyclic extension is received, no auto-correlation peaks will be present, which indicates the absence of a payload transmission.)

By observing the signal level information, the low bit rate preamble carrier detection, as well as the high bit rate payload carrier detection, a more reliable carrier sense detection of OFDM (payload) signals can be achieved.

It is to be understood that the embodiments and variations shown and described herein are merely illustrative of the principles of this invention and that various modifications may be implemented by those skilled in the art without departing from the scope and spirit of the invention.

We claim:

1. A first wireless communication device, comprising:
   a controller configured to monitor for an acknowledgement (ACK) message transmitted by a second wireless communication device in response to a message transmitted by said first wireless communication device, and
   a collision detector that monitors a wireless medium for collisions of said acknowledgement message based on a comparison of an energy level and an energy level threshold, preamble detection, and payload detection.

2. The first wireless communication device of claim 1, wherein said collision detector evaluates said energy level and detects a collision based on said energy level and said preamble detection or based on said energy level and said payload detection.

3. The first wireless communication device of claim 2, wherein said collision detector includes a payload detector and detects a collision based on said detected payload.

4. The first wireless communication device of claim 3, wherein said collision detector includes a preamble detector and detects a collision based on said detected preamble.

5. The first wireless communication device of claim 1, wherein said collision detector is activated after said first wireless communication device transmits data.

6. The first wireless communication device of claim 1, wherein said collision detector does not detect a collision if an ACK message or data header is received.

7. The first wireless communication device of claim 1, wherein said device is implemented in accordance with the IEEE 802.11 Standard.

8. The first wireless communication device of claim 1, wherein said controller determines if said second wireless communication device correctly received said transmitted message by monitoring said wireless medium.

9. The first wireless communication device of claim 1, wherein said controller determines that said second wireless communication device did not likely receive said message if a collision is detected.

10. The first wireless communication device of claim 1, wherein said controller determines that said collision was a cause of not receiving said ACK message.

11. A method for detecting a collision in a wireless communication network, said method comprising the steps of:
    monitoring said wireless communication network for an acknowledgement message received in response to transmitted data; and
    monitoring said wireless communication network to detect a collision of said acknowledgement message based on a comparison of an energy level and an energy level threshold, preamble detection, and payload detection, wherein one or more of said steps are performed by a processor.

12. The method of claim 11, wherein said monitoring to detect said collision step further comprises the step of detecting a payload and said collision detection is further based on said detected payload.

13. The method of claim 11, wherein said monitoring to detect said collision step further comprises the step of detecting a preamble and said collision detection is further based on said detected preamble.

14. The method of claim 11, wherein said monitoring steps are performed after said data is transmitted.

15. The method of claim 11, wherein said monitoring for said acknowledgement message step does not detect a collision if an ACK message or data header is received.

16. The method of claim 11, wherein said method is implemented in accordance with the IEEE 802.11 Standard.

* * * * *